United States Patent Office 3,605,381
Patented Sept. 20, 1971

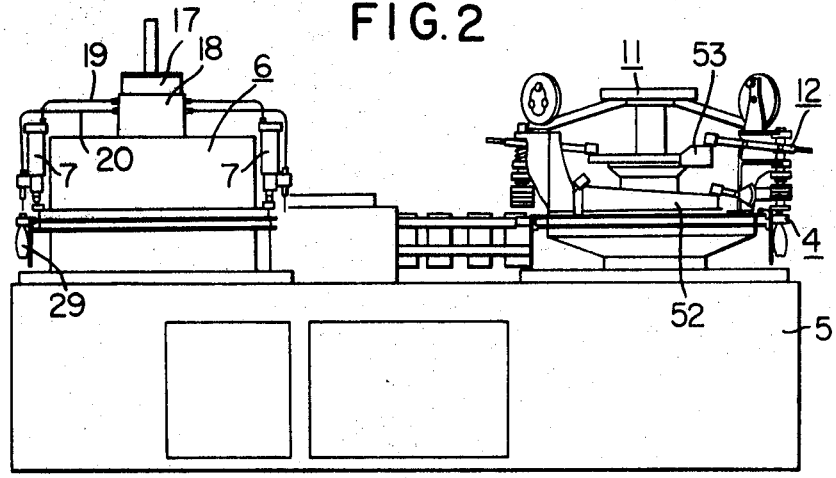
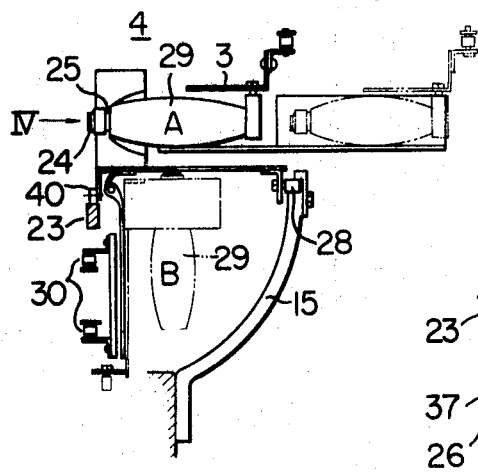
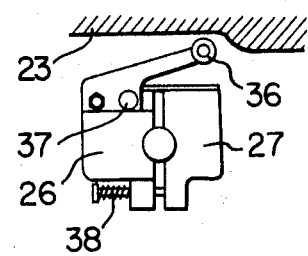

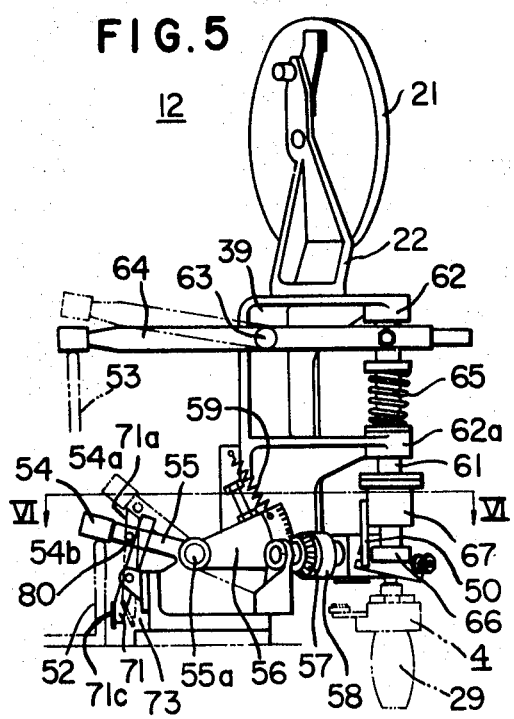
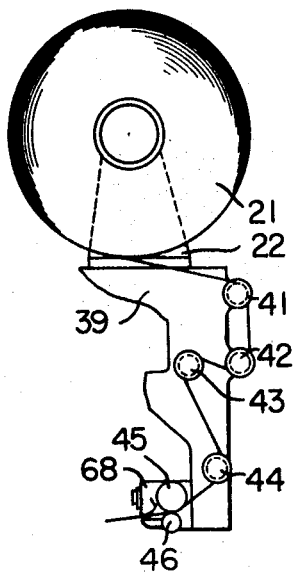
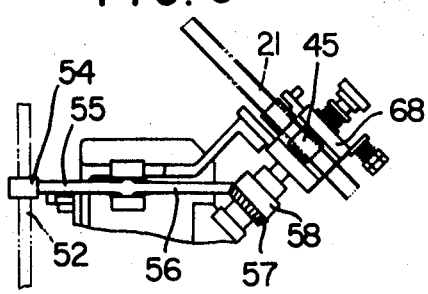
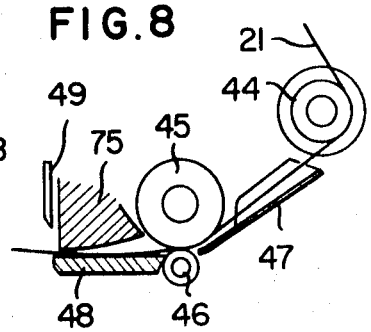
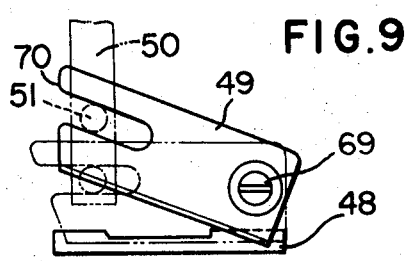

3,605,381
APPARATUS FOR FILLING AND SEALING
SYNTHETIC RESIN CONTAINERS
Shinsuke Yoshikawa and Yuji Sawa, Iwaki-shi, Japan, assignors to Kureha Kagaku Kogyo Kabushiki Kaisha, Tokyo-to, Japan
Filed Jan. 12, 1970, Ser. No. 2,168
Int. Cl. B65b 3/00; B67c 3/02
U.S. Cl. 53—266
4 Claims

ABSTRACT OF THE DISCLOSURE

Fluid containers of a flexible synthetic resin are automatically filled and sealed in continuous succession by a filling rotary and a sealing rotary coupled by an endless holder conveyor which is passed around them and supports equally spaced holders for grasping and holding the neck parts of respective containers, the containers being fed to the conveyor by a pan conveyor and inserted into respective holders by pushing members mounted on an endless chain disposed at one part at an oblique angle relative to the holder conveyor to operate the pushing members.

BACKGROUND OF THE INVENTION

This invention relates generally to automatic apparatus for filling container structures with products and sealing the same. More particularly, the invention relates to a new continuous filling and sealing apparatus capable of efficiently performing the steps of feeding a continuous stream of container structures (hereinafter referred to as containers) made of flexible thermoplastic synthetic resin, filling the containers with their intended contents, sealing the openings of the containers, and effectively delivering the filled and sealed containers.

Heretofore, in filling containers such as bottles made of flexible resins such as polyethylenes, particularly synthetic resin containers of pliable body structure which, lacking rigidity, cannot stand erect in a self-supporting manner, it has been the common practice to fill the containers one by one by hand or to fill a number of the containers simultaneously by utilising a holder for holding a number of cylindrical containers. For sealing in each case after thus filling, the containers must be supplied to a position below a sealer to be sealed.

In the former case (hand filling), the containers deform differently depending on the manner in which they are held, whereby irregularity in internal capacity or fluid level occurs. Furthermore, in order to seal the containers, they are tilted toward the horizontal direction in some cases, and as a result the fluid contents disadvantageously spill out, whereby this process is unsuitable for quantity (mass) production.

In the latter case (simultaneous filling), when the walls of the containers are thin, and the body structure of each container has very low rigidity as in bottles made of vinylidene chloride resins, it is difficult to obtain alignment of centers of the container openings and the nozzles for filling even when the containers are placed in cylindrical holders. Particularly when the contents of the containers are at a high temperature, the alignment of centers in the sealing process step is extremely difficult because of deformation due to the weight of the contents and the softening of the containers. Consequently, filling losses readily occur, and deviations in the fluid surface level after filling with a constant quantity become large because of deformation of the containers.

Even if a holder not accompanied by these drawbacks were to be devised and used to fill several containers simultaneously and seal the same with a sealer, there would still be a limit to the production capacity, and an increase in capacity beyond this limit would require increased space and give rise to higher equipment cost.

SUMMARY OF THE INVENTION

It is an object of the present invention to provide an apparatus for continuously filling and sealing synthetic resin containers which is not accompanied by the above described difficulties and is capable of easily and positively grasping pliable containers and filling and sealing them at high speed.

The apparatus according to the invention for achieving the objects thereof is of the rotary type and comprises a rotary machine for filling (hereinafter referred to as a filling rotary), a rotary machine for sealing (hereinafter referred to as a sealing rotary), and a container feeding device, the filling and sealing rotaries being spaced apart and being operational coupled by an endless chain conveyor on which container holders are mounted at equal space intervals, and which is passed around the filling and sealing rotaries. The filling and sealing rotaries respectively support filling and sealing devices mounted on their peripheral parts in circular arrangement with circumferential spacing equal to the spacing of the container holders on the chain conveyor.

The nature, details, and utility of the invention will be more clearly apparent from the following detailed description beginning with general considerations and concluding with a specific example of practice constituting a preferred embodiment of the invention and illustrated in the accompanying drawings throughout which like reference numerals designate like parts.

BRIEF DESCRIPTION OF THE DRAWINGS

In the drawings:

FIG. 2 is an elevation, in section taken in the vertical plane indicated by line II—II in FIG. 1, as viewed in the arrow direction;

FIG. 3 is a relatively enlarged elevation, in section taken in the vertical plane indicated by line III—III in FIG. 1, as viewed in the arrow direction;

FIG. 4 is a partial elevation as viewed in the direction indicated by arrow IV in FIG. 3;

FIG. 5 is an elevation showing the essential organization of one unit of the sealing device;

FIG. 6 is a fragmentary plan view, in section taken in the horizontal plane indicated by line VI—VI in FIG. 5, as viewed in the arrow direction;

FIG. 7 is an elevation, with a part cut away, showing the feed mechanism for a metal foil ribbon;

FIG. 8 is a fragmentary, relatively enlarged elevational view showing a driving roller mechanism for the metal foil; and FIG. 9 is an elevational view showing the details of the cutting tool mechanism.

DETAILED DESCRIPTION

Figure 1:
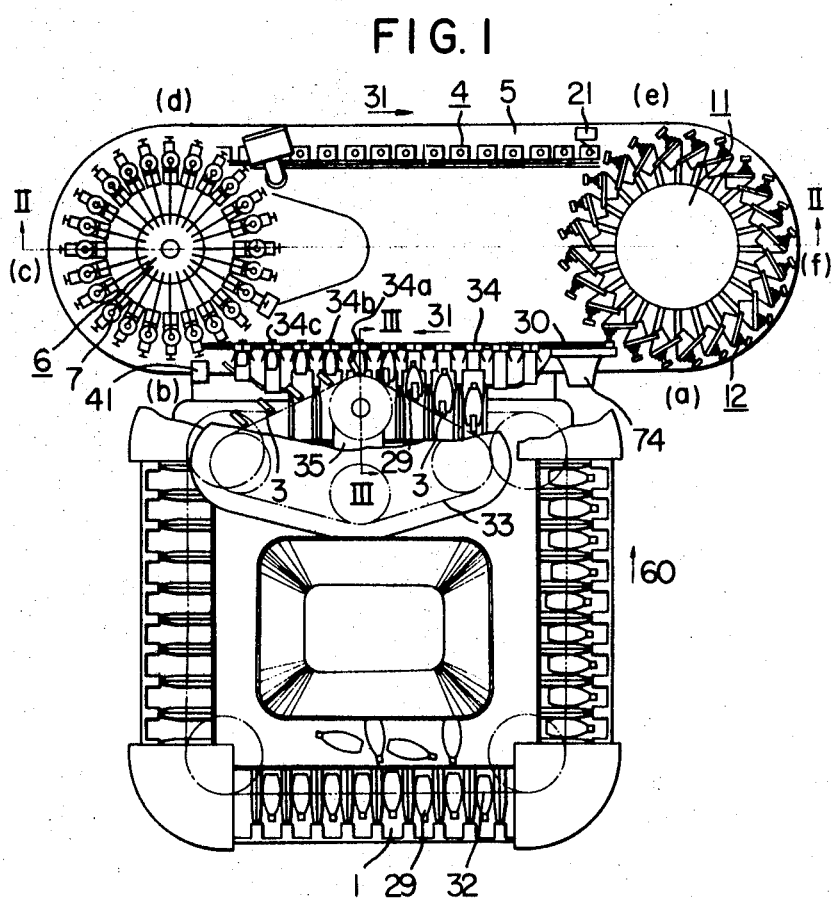
FIG. 1 is a plan view, in simplified form with parts cut away, showing an example of an apparatus embodying the invention.

As briefly mentioned hereinbefore, the two rotaries of the apparatus of the invention are mutually spaced apart and operational connected by a chain conveyor of endless type on which container holders are mounted in an endless row. At one portion of the path of this chain conveyor, a pan conveyor is provided to move parallelly to and at the same speed as the chain conveyor, whereby empty containers placed on the pans of this pan conveyor are automatically inserted into respective container holders on the chain conveyor by a container loading device during the interval in which the two conveyors are traveling confluently in unison.

The operational step of placing the empty containers on the pan conveyor can be carried out manually or automatically by a feeding apparatus including mechanisms such as an alignment device for directionally aligning the containers by vibration or some other action, a transfer device for transferring the aligned containers, and a device for feeding the containers onto the pan conveyor thereby to afford automatization of the entire system.

As the empty containers riding on respective pans of the pan conveyor enter the container loading region between the two rotaries, they are grasped around their neck parts by respective holders and are thus conveyed to the filling rotary. In this filling rotary, a valve opens after verification of the arrival of each empty container to permit the container contents to be charged into the container. This filling rotary is provided with a large number of filling cylinders and accomplishes continuous filling.

The containers thus filled with their contents are conveyed, still held by their respective holders, by the aforementioned chain conveyor to the sealing rotary. This sealing rotary may be provided with sealing devices of any suitable type, examples of preferred types being as follows.

(1) A metal-foil sealing device for feeding a metal foil of ribbon or tape form by increments of constant length, cutting the foil tape, and accomplishing heat adhesion, a plurality of these devices being mounted on a revolving turntable. As each container held by its holder enters the sealing rotary, it arrives at a position where the opening thereof is disposed immediately below a sealing device of the above description, by which the opening is melt sealed with a piece of the metal foil.

(2) A high-frequency sealing device in which electrodes clamp the part of each container opening part to be heat sealed, and high-frequency wave energy is introduced by a contactless method to accomplish fusion adhesion and, at the same time, to cut off surplus material by fusion. Alternatively, the surplus material may be cut off by means of a cutting tool.

(3) A device provided with automatic cappers for accomplishing direct cap sealing.

The containers thus sealed are conveyed away from the sealing rotary and are ungrasped and released by their respective holders at a device such as a chute for directing out the packaged product. Thus, feeding, filling, and sealing of containers of synthetic resin can be carried out efficiently and reliably by the above described apparatus provided with two rotaries and a container-feeding device therebetween.

PREFERRED EMBODIMENT OF THE INVENTION

The invention will now be described with respect to an example of preferred embodiment thereof, it being understood that this example is presented as illustrative only and that it is not intended to limit the scope of the invention.

Referring to the drawings, a filling rotary 6 revolving continuously about a vertical axis in operation and a sealing rotary 11 for carrying out sealing as it revolves also about a vertical axis are mounted on a base structure 5. These two rotaries 6 and 11 are connected by an endless chain conveyor 30, on which a plurality of container holders 4 are mounted at equal intervals, and which travels horizontally in the circulatory direction of arrows 31.

This combination of the filling and sealing rotaries 6 and 11 and holders 4 on the chain conveyor 30 is supplied with empty containers by a container feeding device, the essential parts of which are a pan conveyor comprising an endless chain 32 carrying a plurality of parallel pans 1 and supported to travel in a circulatory path in the direction of arrow 60 counter to the circulatory direction of the filling rotary 6 and an endless chain 33 on which a plurality of container pushing members 3 are mounted, and which is supported to travel obliquely relative to the chain 32 but in the same circulatory direction.

When empty containers 29 are placed on the container pans 1, and all of the chains are driven by driving means (not shown), a pushing member 3 positioned above a pan 1 at a position 34 as shown in FIG. 1 begins to push the container 29 resting on that pan 1. Then, as the chains travel further, and the instant pushing member 1 moves obliquely to the left (as viewed in FIG. 1), the instant container 29 is progressively pushed toward the chain conveyor 30 until, at a position 34a, it is inserted into and is engaged by a corresponding container holder 4 as indicated in FIG. 3, the position of the open end or head part 24 of the container 29 being determined by a step 25 formed on the holding jaws 26 and 27 of the holder 4. Fine adjustment of the pushing members 3 can be accomplished by adjustably moving a bracket 35 toward or away from the chain conveyor 30.

As the container holder 4 into which the instant empty container 29 has been inserted travels further and reaches a position 34b, a cam follower 36 connected to the jaw 26 of the holder separates from a cam 23, as indicated in FIG. 4, whereupon the jaw 26 is rotated by a spring 38 about a pivot 37 to hold firmly the head part 24 of the container 29.

Then, at a position 34c, the container holder 4, which has been in a horizontal position A, is caused by a cam 15 acting through a cam follower 28 to rotate about a pivot 40 to a vertical position B, and conveys the empty container 29 thereby held vertical to the filling rotary 6. At a point slightly in front of, or upstream from, the point b where the holders enter the filling rotary 6, a monitoring or detecting device 41 detects the presence or absence of a container in each holder 4.

When the presence of a container in a holder is thus confirmed, which is the normal operational condition, a corresponding filling cylinder 7 charges that container with a predetermined quantity of the content in the period during which the container and the revolving cylinder 7 advance from position b, through position c, to position d. Each cylinder 7 is connected to a central tank 18 by a compressed air pipe 19 and a content product pipe 20. The timing of the supplying of the compressed air and the content product is determined by a rotary valve (not shown) provided between a tank 17 and tank 18.

A container 29 thus filled and still held in its holder 4 is conveyed uninterruptedly in the direction 31 as indicated in FIG. 1 and enters the sealing rotary 11. This rotary comprises, essentially, a plurality of sealing device units 12 mounted on a horizontal turntable at equally spaced intervals around the peripheral part thereof and disposed in a plane directly above the plane of the path of travel of the containers so that the opening of each container is confronted by and aligned with one of the sealing devices 12.

In the instant example, each sealing device unit 12 has an organization as illustrated in FIGS. 5 through 9, in which a metal foil 21 of ribbon or tape wound on a reel rotatably supported by a bracket 22 is guided by guide rollers 41, 42, 43, and 44 rotatably supported on a frame structure 39 of the sealing device and is fed out in increments of constant length by a driving roller 45 and a pinch roller 46. The operation of this foil feeding mechanism is as follows.

As indicated in FIGS. 5 and 6, a cam 52, acting through a roller follower 54, causes an arm 55 to be raised, rotating about a pivot 55a, and a sector gear 56 formed integrally with the arm 55 to descend, whereupon a gear 57 meshed with the sector gear 56 is rotated. Accordingly, the aforementioned driving roller 45 coupled directly to the gear 57 through a clutch 58 is thereby rotated through a certain angle corresponding to one of the aforementioned increments of constant length of the metal foil tape 21. The roller follower 54 is then in its highest position 54a.

At a certain position in the revolution of the sealing device unit 12, the contour of the cam 52 recedes from the follower 54, whereupon the sector gear 56 is pulled upward by a spring 59, and the roller follower 54 returns to a position 54b. During this return operation, the gear 57 rotates in the reverse direction, but the clutch 58, which is of an over-running type, does not transmit this reverse rotation, whereby the driving roller does not rotate in the reverse direction.

On one hand, the frame structure 39 supports two bearings 62 and 62a, which are in vertical coaxial alignment and slidably hold a vertical shaft 61. The shaft 61 is actuated in vertical sliding movement by a lever 64 actuated in turn in rotation around a pivot 63 by a cam 53, an upward rise in the contour of the cam 53 causing the shaft 61 to descend, and a downward recession of the cam contour permitting a spring 65 to raise the shaft 61 in return motion. This vertical shaft 61 is provided at its lower end with a heater 66 mounted thereon.

As indicated best in FIGS. 8 and 9, a stationary cutting tool or blade 48 is fixed to a roll box 68 to provide shear action counter to the shear cutting action of a moving blade 49 about a pivot 69. The moving blade 49 is actuated to undergo this cutting action by a bracket 50 fixed to a part 67 of the above mentioned vertical shaft 61, vertical movements of the bracket being transmitted by a pin 51 embedded therein at its root end and engaged at its exposed end with a slot 70 formed in the blade 49.

The operation of the sealing rotary will now be described with respect to the work flow. As each container, held by its holder 4, advances in the direction 31 and reaches a point slightly upstream from position e, the presence or absence of this container in the holder is detected by a monitoring or detecting device 21, which thereupon sends a command signal to a sealing device unit 12 set in correspondence with the instant container holder 4.

That is, when the container is absent, a lever 71 of the sealing device 12 is pushed at a part 71c thereof by a seperate operation so that it rotates about a pivot 73 to position 71a, at which it engages a projection 80 fixed to the aforementioned arm 55, which is thereby set so that it will not descend from position 54a.

When the container is present in the inserted state in the holder 4, the lever 71 is in the position shown in FIG. 5, and, at the path position e as shown in FIG. 1, the arm is in the angular position of 54b. Then, as the holder 4 and rotary 11 revolve further, the aforementioned cam 52 causes the arm 55 to be raised to rotate the driving roller 45 through sector gear 56 and gear 57, whereby the predetermined length of the metal foil 21 is fed forward.

Lateral deviations in movement of the foil ribbon 21 during this operation are limited by suitably adjusting a guide member 47. Vertical movement of the foil ribbon 21 is limited by the aforementioned stationary blade 48 acting from below and a guide member 75 acting from above. The metal foil ribbon 21 thus fed forward arrives at a position immediately above the opening of the corresponding container 29 still held in its holder 4.

As the revolution of the sealing rotary 11 proceeds further, and the container 29 and its holder 4 approach a point f, the aforementioned vertical shaft 61 of the corresponding sealing unit 12 is lowered by the action of the cam 53, whereupon the moving blade 49 is lowered by the bracket 50 and cuts the metal foil 21 transversely, thereby severing a piece of the foil of the predetermined length. At the same time, the heater 66 mounted on the lower end of the vertical shaft 61 presses the piece of the metal foil thus severed against the opening rim of the container, whereupon the piece of metal foil is bonded to the opening rim of the container by an adhesive which has previously been applied to the metal foil 21. The container opening is thus closed and sealed.

Then, as the instant container thus sealed and the related mechanism parts arrive at position a, the cam 53 permits the vertical shaft 61 to rise, and the container thus filled and sealed separates away from the sealing rotary 11 and, at a position slightly further downstream, separates from its holder 4, which has been opened by the cam 23. The container then drops through a chute 74 and is conveyed to the succeeding process.

Thus, as will be apparent from the foregoing description, the filling and sealing apparatus according to the present invention is capable of performing the continuous operation of supplying, by means of a simple feeding device, empty containers made of a pliable synthetic resin in a continuous flow, grasping and holding each container at its neck part having a relatively thick wall, and conveying the containers in a continuous flow around a filling rotary and a sealing rotary, wherein alignment of centers is accurate and positive, and containers without self-supporting rigidity can be held accurately without imparting excessive force or an unreasonable condition. As a result, uniform filling and positive sealing can be accomplished efficiently and at high speed.

It should be understood, of course, that the foregoing disclosure relates principally to only a preferred embodiment of the invention and that it is intended to cover all changes and modifications of the example of the invention herein chosen for the purposes of the disclosure, which do not constitute departures from the spirit and scope of the invention. For example, while the invention has been described above with respect to an example wherein metal foil sealing devices are used in the sealing rotary, it is also possible to use, instead, any other suitable type of sealing device such as a high-frequency sealing device or a cap sealing device of known type. In all such cases where alternative sealing devices are used, the sealing process can be carried out efficiently and rapidly because of the stable and firm manner in which the containers are held during the process.

We claim:

1. Apparatus for continuously filling and sealing containers of synthetic resins comprising, in combination: a filling rotary (6) provided therearound with a plurality of filling devices (8) disposed at equal spacing intervals; a sealing rotary (11) provided therearound with a plurality of sealing devices (12) disposed at said spacing intervals; an endless chain conveyor (30) passed around and coupling said filling and sealing rotaries and supporting therealong at said intervals of spacing a plurality of holders (4) each adapted to hold a container of pliable synthetic resin at a neck part thereof and mounted on said conveyor in a manner permitting rotation of said holder through at least 90 degrees of angle from a vertical attitude, each holder being in horizontal attitude at one part of one span of the conveyor between said rotaries; and an empty container feeding device comprising a pan conveyor (32) supporting therealong a plurality of container carrying pans (1) and transporting said pans parallelly to and at the same speed as the holders in said horizontal attitude and a chain (33) traveling obliquely to the path of travel of said pans and supporting container pushing members (3), said pushing members thereby advancing over respective pans relative thereto to push and insert the containers carried thereon into respective holders to be held thereby and thus conveyed around the filling and sealing rotaries driven continuously and in unison with the chain conveyor, each container thereby being automatically filled and sealed and thereafter released by its holder to be discharged out of the apparatus.

2. Apparatus as claimed in claim 1 in which each of said sealing devices (12) is of a metal foil sealing type.

3. Apparatus as claimed in claim 1 in which each of said sealing devices (12) is of a high-frequency sealing type.

4. Apparatus as claimed in claim 1 in which each of said sealing devices (12) is of a cap sealing type.

References Cited

UNITED STATES PATENTS

| | | | |
|---|---|---|---|
| 2,841,938 | 7/1958 | Speroni | 53—282 |
| 3,309,836 | 3/1967 | Hallowell | 53—282X |

FOREIGN PATENTS

| | | |
|---|---|---|
| 1,030,211 | 5/1958 | Germany. |
| 1,044,181 | 9/1966 | Great Britain. |

THERON E. CONDON, Primary Examiner

R. L. SPRUILL, Assistant Examiner

U.S. Cl. X.R.

53—282; 198—22B, 33AC